May 4, 1937.  H. RANISH  2,079,038
DETACHABLE SEDIMENT TRAP FOR SINKS, ETC
Filed Aug. 12, 1935   2 Sheets-Sheet 1
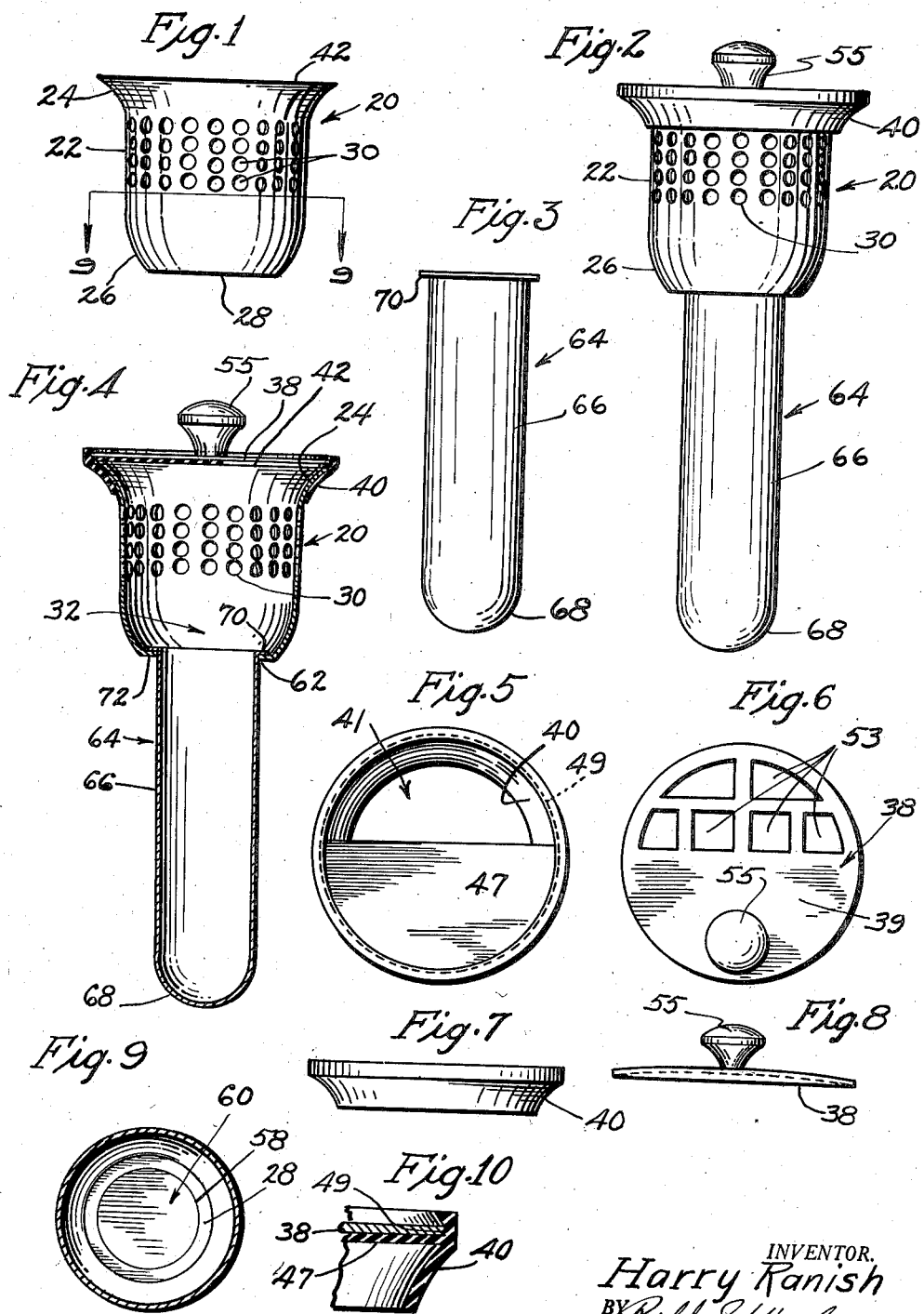

May 4, 1937. H. RANISH 2,079,038
DETACHABLE SEDIMENT TRAP FOR SINKS, ETC
Filed Aug. 12, 1935 2 Sheets-Sheet 2
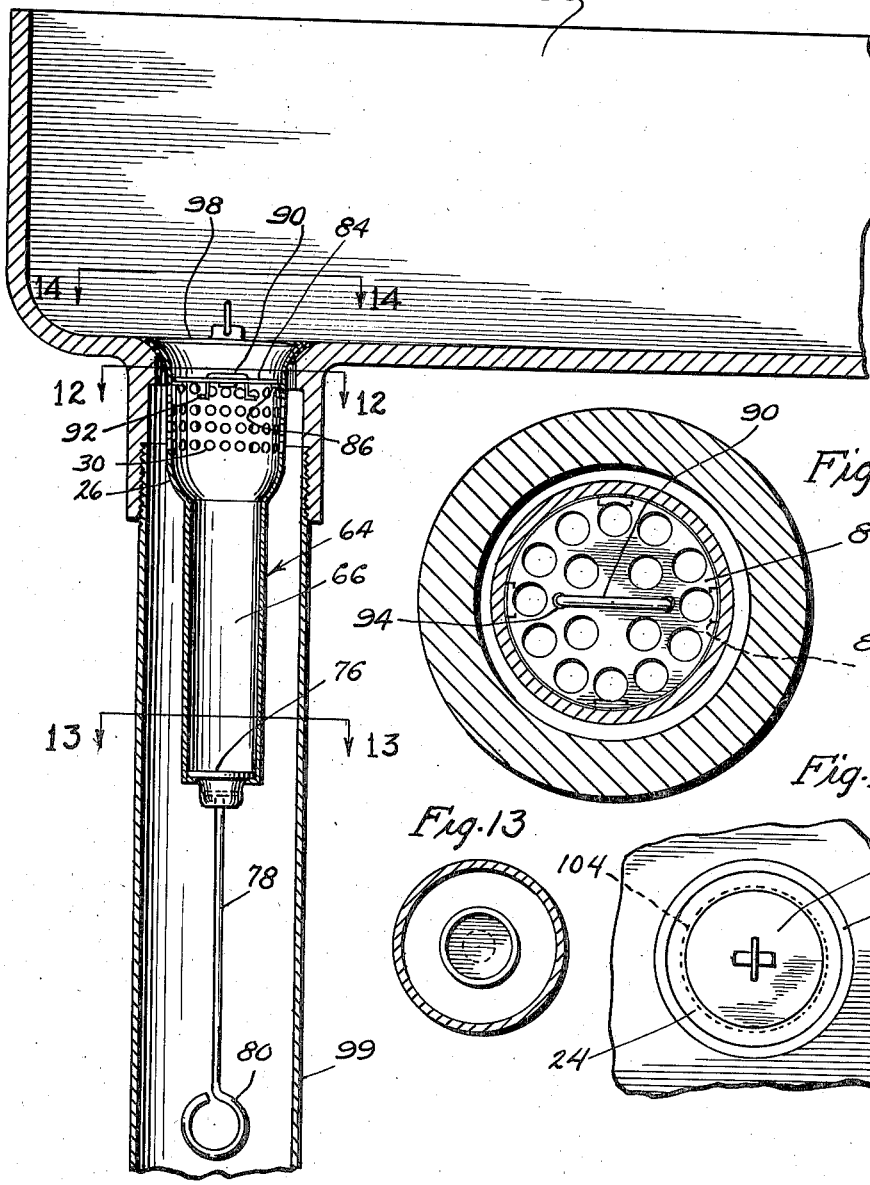
INVENTOR.
Harry Ranish
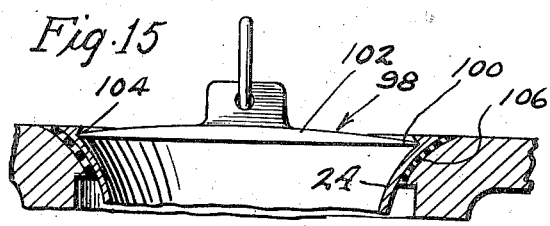
ATTORNEY Patented May 4, 1937

2,079,038

UNITED STATES PATENT OFFICE 2,079,038

DETACHABLE SEDIMENT TRAP FOR SINKS, ETC.

Harry Ranish, Los Angeles, Calif.

Application August 12, 1935, Serial No. 35,745

10 Claims. (Cl. 4—291)

As the title of this invention would indicate, the device of this invention relates to means to gather and entrap foreign matter which would otherwise find its way into the drain trap of sinks, lavatories, laundry trays, etc., thereby eliminating clogging such drain.

I am aware that devices have been developed and attempts made to overcome the general inconveniences found in the ordinary kitchen sink, however all attempts that have come to my attention to cure the trouble have been failures, for the reason of inconvenience, unsanitariness, obtrusiveness and cost.

It is therefore a prime object of the present invention to provide a detachable filter and sediment trap to be inserted in the drain of a sink, lavatory and/or laundry tray, and to be used in combination therewith.

Another object of the invention is to provide novel means, in combination with such filter and sediment trap to retain or drain the fluid content of such sink, etc., without removing or displacing any part of said trap.

Another object of the invention is to provide in combination with the means set forth in the preceding paragraph, means adapted to function as an auxiliary filter to said device, when it is desired to drain the contents of such sink, etc.

A further object of the invention is to provide in combination with a filter and sediment trap for drains, novel means to evacuate the entrapped sediment.

A still further object of the invention is to provide, in combination with a filter and sediment trap for drains, a screen that is auxiliary to said trap, and novel means to support said auxiliary screen in said trap, and novel means to lift said screen from said trap for the purpose of inspection and/or cleaning the device.

Advantages of the invention are ready adaptation to standard plumbing fixtures, effective filtration and entrapment of sediment and other foreign matter, accessibility for inspection and/or cleaning, and low cost of manufacture.

Other objects, features and advantages of the invention may be apparent from the accompanying drawings, specification and the subjoined claims.

In the drawings of which there are two sheets,

Figure 1 is a side elevation showing the device of this invention.

Figure 2 is a side elevation showing the device of this invention fitted with an auxiliary sediment trap.

Figure 3 is a side elevation of the auxiliary trap, per se.

Figure 4 is a view in section showing the device illustrated in Figure 2.

Figure 5 is a plan view of the annular form or band fitted about the upper edge of the filter and sediment trap.

Figure 6 is a plan view of the stopper disc and auxiliary screen, which is adapted to fit within an annular seat formed in the device shown in Figure 5.

Figure 7 is a side elevation of the device illustrated in Figure 5.

Figure 8 is a side elevation of the device illustrated in Figure 6.

Figure 9 is a sectional view taken on line 9—9, Figure 1, showing the knockout section, to be removed prior to insertion of the auxiliary trap.

Figure 10 is a detail showing how the stopper disc is seated in the annular form illustrated in Figures 5 and 7.

Figure 11 is a modified form of the device shown in Figures 2 and 4, showing in addition thereto, means to expel sediment entrapped in the device.

Figure 12 is a sectional view taken on line 12—12, Figure 11, particularly showing the means employed to support the auxiliary screen and the means adapted to lift the screen from the device for inspection or cleaning.

Figure 13 is a view in section taken on line 13—13, Figure 11.

Figure 14 is a plan view in section taken on line 14—14, Figure 11.

Figure 15 is a detail showing how the stopper is seated in the trap, together with the means employed to form a snug union between the device and the sides of the drain hole in the sink, laundry tray and/or lavatory, etc.

In the drawings the reference character 20 indicates one form of the device of this invention, and is shown in Figure 1 as being substantially cup shaped, having substantially parallel sides 22, outwardly curved and divergently flared upper extremities 24 and inwardly curved lower extremities 26, that flatten to form a bottom 28. A plurality of drainage apertures 30 are formed in the sides 22 of the device to permit fluid, usually water, to drain therefrom, while sediment or other water-borne matter will drop into the bottom area 32 of the device 20.

In order to make a more perfect union with the sides of the drain hole 34 (see Fig. 11) of the sink 36, as well as to provide a seat for a flow stop-disc 38, I provide an annular band 40 to fit the upper part of the outwardly curved sides 24 and extending over the top edges 42 of the device 20.

As shown in Figures 2 and 4 the band 40 is made of a flexible material, preferably rubber to form a tight, yet cushioned seat for the device when inserted in the drain hole of a sink, while as shown in Figures 4, 5, and 10 that part of the band 40 which extends over the top edges 42 of the device is adapted to seat a stopper-disc 38 in a manner to be hereinafter described.

The parts illustrated in Figures 5 and 6 when taken together form a flow-stop when it is desired to keep water in the sink or other container, and as will be seen by reference to Figures 5 and 10, the band 40 is formed integrally with a web 47 which occupies approximately fifty percent of the area delineated by the said band 40 while approximately fifty percent or less is open and unrestricted so that water may readily flow therethrough.

Superposed on and adjacent to the web 47, an annular recess 49 is formed in the wall of the band 40. The recess 49 is adapted to receive a flow-stop disc 38 having a plurality of drain holes 53 formed therein, and which, for drainage, are adapted to be registered with the open section of the band 40 or when drainage is not desired the disc 38 is rotated by means of the finger grip 55, so that the drain holes 53 register with the blank surface presented by the web 47. Drainage from the sink is hence prevented for the reason that the solid surface 39 of the disc 38 covers the open part 41 of the band 40, thereby effectively cutting off downward passage.

If experience shows an excess of foreign matter suspended or otherwise present in the water and it is not desirable to too frequently remove the device from the sink drain for cleaning, I have provided a novel method to greatly increase the capacity of the sediment trap. By referring to Figure 9 it will be observed that the bottom of the trap is scored by an annular cut or depression 58 so that the section 60 may readily be knocked out to form an annular opening 62 into which the auxiliary trap 64 may be placed. The trap 64 is essentially an elongated tube 66 having one end closed as at 68, while its other end is open and is formed with outwardly extending flanges 70 which, when the auxiliary trap is fitted within the opening 62, rest upon the bottom flanges 72 of the trap 20, thereby supporting the auxiliary trap 64 in pendant position.

In Figure 11, I show a modified form of the device illustrated in Figures 1-10 inclusive. In this form of the invention the filter and sediment trap substantially represent the form of the device illustrated in Figures 2 and 4. However, here the auxiliary trap 64 is fitted with a piston 76 secured to a plunger 78 having a hand grip 80, the whole of which is adapted to be forced upwardly through the cylindrical form of the auxiliary trap 64 so that sediment or other matter which may have collected therein, may be readily expelled therefrom by the simple act of pushing the piston 76 upwardly therethrough.

In this form of the device, I have provided an auxiliary screen 84, which while analogous to the screen shown in Figure 6, nevertheless is quite different therefrom, inasmuch as the screen 84 is wholly a screen and not partially a valve as is the element shown in Figure 6.

The screen 84 is adapted to rest upon the inwardly turned flaps 86 which may be punchings formed at the time the drain apertures 30 are formed.

As will be apparent from the drawings, the screen 84 is seated rather deeply for protection as well as convenience, and for that reason I have provided a convenient finger grip 90 which is roughly comparable to an inverted U having outwardly turned prongs 92. The grip 90 is loosely fitted into holes 94 formed in the screen 84 and rests by its own weight upon the upper surface thereof.

I have also provided a stop valve 98, to close the opening into the filter and sediment trap, and which as shown in Figure 15 is formed with a feathered edge 100, but having a thicker inner body portion 102.

The feathered edge 100 of the valve 98 is adapted to be seated within the annular groove 104 which is formed by the overhanging inner side wall of the filter and trap 20. An annular band 106 of a flexible material, such as rubber, is also fitted upon the outwardly flared and curved upper side walls of the filter, the purpose of which is, as previously stated, to firmly, securely and tightly seat the filter within the drain hole of the sink, laundry tray or lavatory within which the device is situated.

To use and place the device of this invention in operation it is only necessary to remove the standard screen from the sink, etc., and to insert the device 20 or any of its various modifications into the throat of the drain.

As illustrated in Figure 2 the device is fitted with a band 40 and a disc valve 38. After the device is placed in operative position it is only necessary to rotate disc 38 to cause drain holes 53 to register with the uncovered area 41 of the band 40, or conversely to cover such open section by rotating the disc so that the solid portion 39 covers such open section, thereby effectively closing the passage to the drain and keeping the water within the sink, etc.

If the auxiliary trap 64 is incorporated with the form shown in Figure 1, its application or use is not varied. The auxiliary trap provides greater capacity to receive refuse from the sink. To clean the device, it is only necessary to lift the trap from the drain, its contents may be either shaken or flushed out with water.

The annular band 40 is adapted to form a water-tight union with the sides of the sink drain, thereby eliminating pipe threading as a means of securing the device in place.

In so far as the collection of matter is concerned, the form of the device shown in Figure 11 functions exactly as that shown in Figures 1 to 10 inclusive, however the form shown in Figure 11 provides mechanical means to expel the contents of the trap, by the use of the associated piston 76 and plunger 78, after the device has been lifted from the sink drain pipe.

It is believed the use of the stopper valve 98 will be apparent for it is only necessary to seat its feathered edge 100 within the annular seat 104. This may be readily accomplished by pushing the valve downwardly and simultaneously giving it a rotary motion.

The screen 84 rests upon the flaps 86 and may be readily removed by lifting upwardly upon the finger grip 90, after a predetermined amount of lost motion, the prongs 92 are brought to bear upon the under side of the screen, thereby forcing it from its seat upon the flaps 86, it is then readily lifted by the fingers. The remainder of the trap may be readily removed from the drain, after which the plunger and piston are forced inwardly to expel the material collected in the trap, the device may then be washed and replaced within the drain pipe 99.

It will be found that while the drain holes or apertures 30 readily permit water to pass therethrough and thence to the drain pipe 99, nevertheless there is an interval of pause that permits matter either in partial suspension, or being carried along with the current to be dropped into the trap formed by that portion 32 of the device which lies immediately below the drain holes 30, or into the auxiliary trap 64, as the case may be.

While I have described the preferred forms of my invention, I do hereby also claim as my invention all such colorable variation and imitation of my present invention as clearly falls within the scope of the invention herein shown and described.

I claim:

1. The combination in a domestic plumbing system having a reservoir and a drain, of means to filter and subsequently entrap water-borne matter, said means comprising a perforated cup having a sump, and a resilient band extending around the upper marginal edges of said cup, said band forming a seal between said drain and said cup.

2. The combination in a domestic plumbing system having a reservoir and a drain, of means to filter and subsequently entrap water-borne matter, said means comprising a cup having perforations and a sump, a resilient annular band structure on said cup, said annular band structure being adapted to receive a flow-stop means to facilitate filtration.

3. The combination in a domestic plumbing system having a reservoir and a drain, of means to filter and subsequently entrap water-borne matter, said means comprising a cup having perforations and a sump, a resilient annular band structure on said cup to form a seal between said drain and said cup, means in said annular band structure to effect said filtration, and means in said band structure to effect a valve action to permit drainage or retention of water in said reservoir.

4. The combination in a domestic plumbing system having a reservoir and a drain, of means to filter and subsequently entrap water-borne matter, said means comprising a cup having perforations and a sump, a resilient band structure on said cup, said band being provided with a web to partially close the top of said cup, a secondary screen, perforation punchings flaps to support said secondary screen, and closing means adapted to selectively be placed in register with the opening in the top of said band structure.

5. A filter for drains, comprising a cup shaped receptacle having a plurality of drain apertures, a non-apertured sump appended to said receptacle, means pendant to said sump to mechanically evacuate matter in said sump, flaps, said flaps being formed of reversely bent punchings of certain of said apertures, and a detachable screen within said cup and resting upon said flaps.

6. A filter for drains, comprising a cup shaped receptacle having a plurality of drain apertures, a non-apertured sump appended to said receptacle, means hanging pendant from said sump to mechanically evacuate matter in said sump, a detachable screen in said receptacle, drain aperture punchings flaps to support said screen, and means to lift said screen, said means normally lying flush with said screen.

7. A filter for drains comprising a cup shaped receptacle having sides partially perforated, a resilient band encompassing the upper edges of said cup and having a segment extending over said cup, a disc, said disc having a solid segment and an apertured area, an annular recess to receive said disc, said disc being adapted to be selectively placed in position to close the top of said cup or to permit passage through said cup.

8. The combination in a domestic plumbing system having a receptacle, of means to filter water-borne matter, and means subsequent to said filtration to entrap said matter, said entrapment means comprising an elongated tube pendant to said filtering means.

9. The combination in a domestic plumbing system having a receptacle, of means to filter water-borne matter, and means subsequent to said filtration to entrap said matter, said entrapment means comprising a detachable elongated tube pendant to said filtering means.

10. The combination in a domestic plumbing system having a receptacle, of means to filter water-borne matter, said means comprising a perforated cup, said cup having an annular groove in its inner and upper marginal edge, and a stopper, said stopper being flexible and having a relatively thin feathered edge adapted to nest within said groove.

HARRY RANISH.